United States Patent
Albertone et al.

(10) Patent No.: US 6,645,336 B1
(45) Date of Patent: Nov. 11, 2003

(54) EXTRUSION COATING PROCESS

(75) Inventors: Yannick Albertone, Paris (FR); George J. Ostapchenko, Salem, SC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/670,528

(22) Filed: Sep. 27, 2000

Related U.S. Application Data

(60) Provisional application No. 60/156,167, filed on Sep. 27, 1999.

(51) Int. Cl.[7] .............................................. B32B 31/30
(52) U.S. Cl. .................. 156/247; 156/244.11; 156/289; 427/407.1
(58) Field of Search ...................... 156/244.11, 244.23, 156/247, 289; 427/407.1, 412, 412.1, 331

(56) References Cited

U.S. PATENT DOCUMENTS

| | | | |
|---|---|---|---|
| 4,148,851 A | * | 4/1979 | Tani et al. |
| 4,493,870 A | | 1/1985 | Vrouenraets et al. |
| 4,657,499 A | * | 4/1987 | Lewellen et al. |
| 4,725,481 A | | 2/1988 | Ostapchenko |
| 4,739,012 A | | 4/1988 | Hagman |
| 4,847,142 A | * | 7/1989 | Twilley et al. |
| 4,939,009 A | * | 7/1990 | Beavers et al. |
| 5,532,053 A | | 7/1996 | Mueller |
| 5,827,252 A | | 10/1998 | Werenicz et al. |
| 5,859,083 A | | 1/1999 | Spijkers et al. |
| 5,938,648 A | * | 8/1999 | La Von et al. |
| 6,028,019 A | | 2/2000 | Spijkers et al. |
| 6,187,696 B1 | * | 2/2001 | Lim et al. |

FOREIGN PATENT DOCUMENTS

| | | |
|---|---|---|
| EP | 0 611 037 A1 | 8/1994 |
| EP | 0 295 694 B1 | 12/1998 |
| EP | 0 963 760 A1 | 12/1999 |
| EP | 0 964 026 A1 | 12/1999 |

OTHER PUBLICATIONS

DuPont, "Hytrel polyester elastomer Product Information," Nov. 1993.*
DuPont, "Hytrel polyester elastomer Extrusion Guide," Mar. 1994.*
"A New Cost Effective Method to Confer Tailored Breathability and Liquid Barrier Properties to Nonwovens", J. C. Cardinal & Y. Trouilet, Index 93 Congress, Application Session 7A,–Adding value to Nonwovens, Mar. 1993.
Komiya Yuji, "Preparation of Laminated Body", Patent Abstracts of Japan, Publication No. 56056846, Publication Date May 19, 1981.

* cited by examiner

*Primary Examiner*—Curtis Mayes

(57) ABSTRACT

A process for the preparation of a laminate, particularly a waterproof moisture vapor permeable laminate, comprising a substrate having on a surface thereof a thermoplastic polymer resin coating and further comprising a peelable release layer in contact with the surface of said thermoplastic polymer resin remote from the substrate, and optionally further comprising a tie layer between the substrate and the thermoplastic polymer resin, said process comprising the steps of forming or providing a substrate layer and providing on a surface thereof a thermoplastic polymer resin coating and a peelable release layer and optionally providing a tie layer between the substrate and the thermoplastic polymer resin coating, characterized in that the thermoplastic polymer resin has a viscosity less than about 3000 Pa.s measured according to the standard ISO11443.

19 Claims, 1 Drawing Sheet

EXTRUSION COATING PROCESS

This application claims benefit of priority from Provisional Application No. 60/156,167, filed Sep. 27, 1999.

BACKGROUND OF THE INVENTION

1. Field of the Invention

This invention relates to a process, particularly an extrusion coating process, for the production of a laminate comprising a substrate and a polymer coating, particularly a thin polymer coating. In particular, the invention further relates to a process for the production of laminate products useful in medical, apparel, hygiene, agricultural and construction applications, as for example, in a garment, a diaper, or a roof underliner.

2. Description of the Related Art

Processes for the extrusion melt coating of a polymer resin, such as a polyurethane, polyamide or polyester resin, onto non-woven or other substrates are well known. The process generally involves the steps of heating the polymer to a temperature above its melting point, extruding it through a flat die onto a substrate which passes through the curtain of molten polymer, subjecting the coated substrate to pressure to effect adhesion, and then cooling. The extrusion melt coating method is widely used since it allows economical production of a laminated structure in a one-step procedure.

In some cases, the polymer resin layer is capable of forming a bond to the substrate without the requirement of additional adhesive or primer between the substrate and the polymer resin layer. In other cases, adequate adhesion is obtained only by the use of additional adhesive or primer applied to the substrate. Alternatively, a "tie layer" is co-extruded with the polymer coating as a compatabilizer in order to adhere the polymer coating to the substrate.

There remain, however, disadvantages to extrusion melt coating processes. In particular, with certain polymer resin and substrate combinations even the use of additional adhesive or primer or a tie layer may not be sufficient to ensure the formation of a strong bond between the polymer resin and substrate such that the laminate product has a high resistance to delamination. This is especially the case when it is desired to produce a laminate having a thin polymer resin layer.

It is considered that one reason for the poor adhesion of certain incompatible polymer resin and substrate combinations, especially when thin films are required, is that the polymer resin coating may cool too rapidly upon contact with the substrate to allow for sufficient time for it to interact with the surface of the substrate and create strong adhesion. It is considered that, typically, the adhesion between an incompatible polymer resin coating and substrate, e.g. for a polyester coating and a polyethylene substrate, consists predominantly of mechanical bonding with little or no chemical bonding. There must generally be sufficiently high penetration of the polymer resin coating into the structure of the substrate to ensure a good bond.

In addition, conventional extrusion melt processes may not be suitable for the production of products which require a thin polymer coating. As noted above, the polymer resin coating may cool too rapidly upon contact with the substrate and this may cause the polymer coating to solidify before forming a layer of consistent thickness.

A further disadvantage of extrusion melt coating processes is that there is a tendency for the formation of pinholes in the polymeric layer. It is important to prevent pinholes and provide a continuous coating layer, for instance to ensure that the laminate structure is waterproof. Pinholing arises since the substrate generally consists of a coarse or porous material. During extrusion coating and subsequent pressing, the molten thermoplastic resin enters the pores or interstices of the substrate and, as a result, the thermoplastic resin film may become disrupted by undulations or fibrous projections on the surface of the substrate. Pinholing is a particular problem in the production of thin polymer resin coatings, and to avoid pinholing in such coatings it is generally required to obtain a low penetration of the polymer resin into the substrate. It is therefore a problem to obtain a pinhole-free thin polymer coating which is strongly adhered to the substrate.

One way of minimizing the problems of poor adhesion and pinholing is to increase the thickness of the polymer resin layer. It is considered that a thicker resin layer has the effect of maintaining the temperature at the interface of the polymer resin and the substrate, which would allow a stronger bond to be formed. In addition, a thicker resin layer would be less susceptible to disruption by irregularities in the substrate and therefore be less susceptible to pinholing.

However, increasing the thickness of the polymer resin layer is economically disadvantageous and is not always appropriate for the end-use of the product. As noted above, it is sometimes desirable that the laminate product comprise a thin polymer film layer. For example, in the case of moisture vapor permeable laminates the additional thickness reduces the moisture vapor transmission rate. Laminate structures are also used as waterproof materials or moisture vapor permeable membranes in the production of, for example, wrapping materials, fabrics, medical materials, packaging materials and the like. As the thickness of the resin layer in such laminates is increased in order to minimize pinholing and provide adequate waterproofing, the desirable characteristics of the non-woven fabric are lost. Laminates suitable for such uses may consist of, for example, a polyethylene resin coating on a non-woven fabric substrate. The thickness of the resin layer in such laminates must be at least 40 $\mu$m and preferably 60 $\mu$m or more in order to prevent pinholing and this has the effect of making the laminate structure stiff and hard, thereby reducing the value of the product.

EP-A-0611037 discloses a process for making a laminate usable in protective clothing, diapers, and roof underliners. In the process, a moisture vapor permeable, liquid impermeable, barrier layer with a thickness of 3 to 25 $\mu$m is coextruded with a 1 to 5 $\mu$m thick release layer on one side of the barrier layer and a 1 to 5 $\mu$m thick tie layer on the opposite side of the barrier layer. The tie layer is adhered to a porous substrate such as a woven or nonwoven fabric. The tie layer typically comprises a thermoplastic such as an ethylene copolymer or a polyurethane and serves to improve the adherence between the porous substrate and the breathable thermoplastic barrier layer.

EP-A-0295694 discloses an extrusion melt coating process for the production of a waterproof water-vapor permeable laminate, which addresses the problem of combining adequate water-proofing without pinholing while maintaining the desirable characteristics of the substrate material. The thermoplastic polymer resin used to prepare the laminate is required to have a melt viscosity of at least 5000 Pa.s at a temperature 20 to 30° C. below the extrusion temperature, and this allows the production of a thermoplastic resin film having a thickness of between 5 and 30 $\mu$m. The use of resins which do not satisfy this viscosity requirement is reported as resulting in pinholing. The extruder heating temperature is set such that the melt viscosity of the resin immediately after it is extruded from the die is in the range of 100 to 1000 Pa.s. A resin conforming to this highly temperature-dependent viscosity profile is reported as being relatively unstable in an extrusion process. Accordingly, in the manufacture of the laminate structures of EP-A-0295694 an additional "release layer" (typically polyethylene or polypropylene) having peelability with the first thermoplastic resin layer is co-extruded with the first thermoplastic resin. The release layer is then peeled after cooling to obtain the desired structure.

JP-A-1071742 discloses a laminate for use as a medical waterproof sheet, surgery garment fabric or a wind-breaker fabric comprising a porous substrate and a thermoplastic resin layer having a thickness of between 5 and 30 $\mu$m, wherein the thermoplastic resin has a melt viscosity of at least 50000 poise at a temperature 20° C. below the extrusion temperature. The process for the production of the laminate also involves coextrusion of the thermoplastic resin layer with an additional release layer.

This prior art is concerned with laminates produced using polymers having a certain minimum viscosity and does not address the problems encountered when it is required to produce very thin films on a substrate utilizing polymers of lower viscosity. Typically, when the viscosity is below a certain level, the molten polymer will more readily flow into the interstices and pores of the substrate which, when the polymer coating is a thin layer coating, will increase the likelihood of pinholing, especially where good bond strength is required between the thin polymer layer and the substrate. These prior art processes also do not address the problem of improving adhesion between incompatible polymer resin and substrate layers. There remains a need for an economical process for producing a laminate structure which has good adhesion between a very thin polymer resin layer and a substrate layer.

A principal object of the invention is the provision of an improved process for the manufacture of a laminate having good adhesion between the polymer resin and substrate layers, particularly a laminate comprising a polymer resin of low viscosity, and particularly a laminate comprising a polymer resin and substrate combination which would not strongly adhere using conventional lamination or extrusion coating processes. A further object of the invention is the provision of a process for the manufacture of laminates having a thin polymer resin layer bonded, with good bond strength, to a resin layer without the formation of holes in the resin layer. A further object of the invention is the provision of a process for the manufacture of waterproof moisture vapor permeable laminates, particularly laminates having differential permeability.

DEFINITIONS

Figure 1:
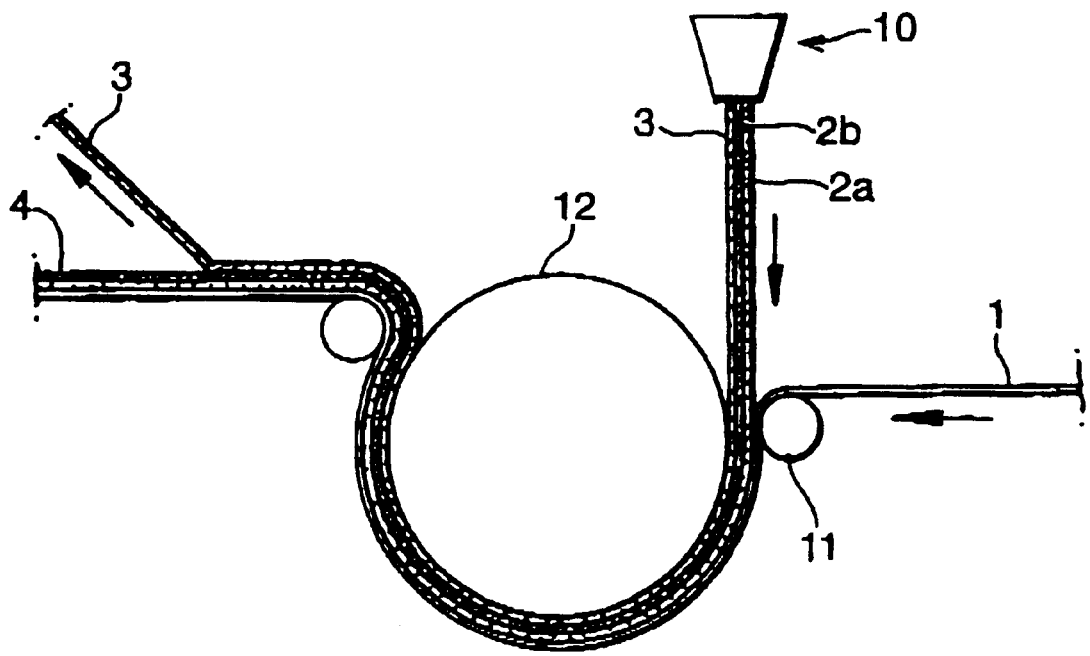
FIG. 1 is a schematic view showing a coextrusion process according to the invention for the production of a three-layer laminate structure.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene and various combinations of the monomers ethylene, propylene, and methylpentene.

The term "polyethylene" as used herein is intended to encompass not only homopolymers of ethylene, but also copolymers wherein at least 85% of the recurring units are ethylene units.

The term "polypropylene" as used herein is intended to encompass not only homopolymers of propylene, but also copolymers wherein at least 85% of the recurring units are propylene units.

The term "nonwoven fabric, sheet or web" as used herein means a structure of individual fibers or threads that are positioned in a random manner to form a planar material without an identifiable pattern, as in a knitted fabric.

DETAILED DESCRIPTION

According to the present invention, there is provided a process for the preparation of a laminate comprising a substrate having on a surface thereof a thermoplastic polymer resin coating and further comprising a peelable release layer in contact with the surface of said thermoplastic polymer resin remote from the substrate, said process comprising the steps of forming or providing a substrate layer and providing on a surface thereof a thermoplastic polymer resin coating and a peelable release layer, characterized in that the thermoplastic polymer resin has a viscosity less than about 3000 Pa.s measured according to the standard ISO11443.

In a preferred embodiment the thermoplastic polymer resin is preferably comprised primarily of a block polyether copolymer, such as a polyether ester copolymer, a polyether amide copolymer, a polyurethane copolymer, polyvinyl alcohol, or a combination thereof. Preferred copolyether ester block copolymers are segmented elastomers having soft polyether segments and hard polyester segments, as disclosed in U.S. Pat. No. 4,739,012 (assigned to DuPont). Suitable polyether ester block copolymers are sold by DuPont under the name Hytrel®. Hytrel® is a registered trademark of DuPont. Suitable copolyether amide copolymers are copolyamides available under the name Pebax® from Atochem Inc. of Glen Rock, N.J., USA. Pebax® is a registered trademark of Elf Atochem, S.A. of Paris, France. Suitable polyurethanes are thermoplastic urethanes available under the name Estane® from The B.F. Goodrich Company of Cleveland, Ohio, USA. In a more preferred embodiment the thermoplastic polymer resin comprises one or more copolyetherester elastomers and it is with regard to this embodiment that the invention will now be described.

The process for the preparation of the laminate may comprise conventional techniques well-known in the art. Conveniently, however, the process is a coextrusion process wherein the respective layers are coextruded onto the substrate, either by simultaneous coextrusion of the respective layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing onto the substrate. The process may also comprise conventional laminating techniques, for example lamination of a preformed polymer coating layer and a preformed release layer either before or simultaneously with lamination thereof with the substrate, or casting, for example, the release layer onto a preformed copolyetherester-containing layer. Typically, such lamination techniques would involve thermal lamination of the respective layers on hot roll calendering equipment, wherein the temperature used to bond the copolyetherester-containing layer to the substrate is sufficient to melt the copolyetherester-containing layer, but not the release layer, and with the application of sufficient pressure, the layers become bonded. A combination of extrusion and lamination techniques may be used.

Preferably, the process is an extrusion coating process wherein the release layer is coextruded with said copolyetherester-containing layer.

The process of the invention has the advantage of providing laminates which have good adhesion between the copolyetherester-containing layer and the substrate, particularly laminates comprising a copolyetherester coating and substrate combination which would not strongly adhere using conventional lamination or extrusion coating processes. The process is of particular use for the manufacture of laminates having a thin polymer resin layer. The process is also of particular use for the manufacture of waterproof moisture vapor permeable laminates, particularly laminates having differential permeability.

The process of the invention is of particular use for the preparation of laminates comprising a thin copolyetherester-containing layer, particularly a layer of thickness less than about 100 $\mu$m, particularly less than about 70 $\mu$m, particularly less than about 50 $\mu$m, particularly less than about 30 $\mu$m, and particularly less than about 20 $\mu$m. Preferably the copolyetherester-containing layer is at least 5 $\mu$m and preferably at least 12 $\mu$m.

For the avoidance of doubt, the order of the layers relative to each other is as follows. The copolyetherester-containing layer is adjacent the substrate; the peelable release layer is adjacent the copolyetherester-containing layer on the surface of the copolyetherester-containing layer which is remote from the substrate.

The substrate may be any woven or non-woven material, preferably a non-woven material, and more preferably a spun-bonded material. In one embodiment of the invention, the substrate comprises at least 50, particularly at least 65, particularly at least 90, and particularly at least 99, weight percent polyolefin, particularly polyethylene or polypropylene. The polyolefin may contain minor amounts of other comonomer units but should contain at least 50, particularly at least 65, particularly at least 90, and particularly at least 99, weight percent of olefin repeating units. In one embodiment, at least 50, particularly at least 65, particularly at least 90, and particularly at least 99, weight percent of the fibers are polyolefin fibers. In a further embodiment, the substrate is any material which when attached via mechanical and/or chemical bonding to a copolyetherester in a conventional manner would ordinarily have a bonding strength of less than 1 N/m as defined by ISO 2411. As used herein, the term "spun-bonded material" means nonwoven fabrics formed by filaments which have been extruded, drawn, and then laid on a continuous belt. Bonding is accomplished by several methods such as by hot-roll calendering or by passing the web through a saturated-steam chamber at an elevated pressure. An example of a spun-bonded nonwoven useful in the invention is Typar® spunbonded polypropylene, available from E.I. du Pont de Nemours and Company.

In an embodiment of the invention, the process further comprises the step of providing a tie layer between the copolyetherester-containing layer and the substrate. The tie layer performs the function of further improving adhesion of the copolyetherester polymer coating to the substrate. In other words, the tie layer is capable of compatabilizing the substrate and the copolyetherester polymer and forms a strong bond to both the substrate and the copolyetherester polymer. In a preferred embodiment, the tie layer comprises one or more copolymers of ethylene and vinyl acetate, preferably a copolymer comprising from about 30 to about 90, preferably about from 60 to about 85 weight percent, preferably from about 67 to about 77 weight percent, ethylene comonomer units and from about 10 to about 70 weight percent, preferably from about 15 to about 40, and preferably from about 23 to about 33 weight percent, vinyl acetate comonomer units. Commercially available materials of this type include ELVAX® (an EVA available from E.I. du Pont de Nemours and Company). Other comonomer units may be present in the copolymer in minor amounts, provided the above-stated amounts of ethylene and vinyl acetate units are also present. Such a tie layer is of particular use when the substrate comprises a polyolefin and the thermoplastic polymer resin comprises one or more copolyetheresters.

The tie layer may further comprise conventional additives known in the art. The amount of said copolymer comprising ethylene and vinyl acetate present in the tie layer is preferably at least 80, more preferably at least 85, more preferably at least 95, and most preferably substantially 100, weight percent of the tie layer.

The thickness of the tie layer, if present, is preferably less than the thickness of the copolyetherester-containing layer and is preferably from about 1 $\mu$m to about 20 $\mu$m, preferably from about 2 $\mu$m to about 8 $\mu$m, and more preferably from about 2 $\mu$m to about 6 $\mu$m.

Optionally, the laminate may include a control layer positioned between the substrate and the tie layer, with the control layer comprising a polymer capable of reducing the moisture vapor transmission rate (MVTR) of the laminate. There is no specific limitation on the polymer which may be used in the control layer provided that such layer has the effect of reducing the MVTR of the laminate and that the control layer is compatible with both the substrate and the tie layer. Examples of suitable polymers include polyethylene or polypropylene or a copolymer thereof comprising ethylene and/or propylene as the main repeating units. A typical thickness of the control layer is from 2 to 15 $\mu$m, preferably from 10 $\mu$m to 15 $\mu$m.

In a further embodiment of the invention, the process comprises the further step of providing additional adhesive or primer on the surface of the substrate prior to application of the copolyetherester-containing layer, or prior to application of the copolyetherester-containing layer and tie layer, thereon.

The process of the invention optionally comprises one or more of the further steps of removing the release layer, either on-line subsequent to cooling of the laminate, or at a later stage after transportation of the laminate; and recycling the release layer once it has been removed from the laminate.

The peelable release layer must have peelability with respect to the copolyetherester-containing layer, and preferably is coextrudable therewith. An important requirement of the peelable release layer is that its viscosity must be similar to that of the copolyetheresters at the processing temperatures involved in the manufacture of the laminate. The peelable release layer generally comprises a polymer resin, typically polyethylene or polypropylene or a copolymer thereof comprising ethylene and/or propylene as the main repeating units. In a preferred embodiment the release layer comprises low density polyethylene (LDPE). An example of a suitable LDPE is STAMYLAN® 8108 (from DSM).

The thickness of the peelable release layer will depend on the thickness of the copolyetherester-containing layer. It is important that the peelable release layer be sufficiently thick to ensure adequate penetration of the copolyetherester-containing layer into the structure of the substrate. It is also important that the peelable release layer be sufficiently thick that it is capable of being peeled from the copolyetherester-containing layer. However, if the release layer is too thick then pinholing results. It has now been found that the thickness of the release layer should be less than the thickness of the copolyetherester-containing layer. Preferably, the thickness of the release layer should be no more than about 90%, and more preferably no more than about 80%, of the thickness of the copolyetherester-containing layer. Preferably, the thickness of the release layer is at least 5%, preferably at least 15%, and preferably at least 30%, of the thickness of the copolyetherester-containing layer. In other words, where $T_{RL}$ is the thickness of the release layer and $T_{CL}$ is the thickness of the copolyetherester-containing layer, then $T_{RL}/T_{CL}$ must be less than 1, preferably less than about 0.9 and more preferably less than about 0.8. Preferably, $T_{RL}/T_{CL}$ is greater than about 0.05, preferably greater than about 0.15, and preferably greater than about 0.3. In a preferred embodiment, $T_{RL}/T_{CL}$ is about 0.8.

For example, in one embodiment of the invention the thickness of the copolyetherester-containing layer is about 30 μm. Correspondingly, the thickness of the peelable release layer should be less than about 30 μm, preferably less than about 27 μm and at least 1.5 μm, and preferably about 24 μm.

The peelable release layer may provide one or more of the following benefits:

(a) It may act as a heat control layer for the purpose of controlling the temperature and therefore the flow of the polymer coating during the coating process. In other words, the release layer provides additional thermal capacity to the polymer coating layer, which allows the coating layer to stay at a higher temperature, and therefore molten, for longer. It is believed that this extended duration of melt provides additional time for the polymer to flow into any interstices of the substrate thereby improving mechanical adhesion. In some cases, the additional heat may initiate or increase melting of the interface between the polymer resin and substrate, thereby increasing adhesion strength. Variation of the thickness and composition of the release layer, and temperature thereof, will permit modulation of the cooling time and flow of the polymer coating, which, in turn, will permit greater control over the adhesion strength between the polymer resin and substrate. It will also permit greater control over the coating quality, particularly in terms of the evenness of the thermoplastic polymer resin layer thickness, to enable the production of a more consistent laminate.

(b) It may act as a protective layer to reduce fouling of the copolyetherester-containing layer, for instance, during later stages of the manufacturing process or during transportation; or to reduce undesirable sticking of the copolyetherester-containing layer to equipment during subsequent processing.

(c) An additional benefit of the reduction in undesirable sticking of the copolyetherester-containing layer to equipment is that it may allow the process to run at higher speeds, typically greater than 100 m/min and often at least 150 m/min.

(d) It may act to reduce pinholes, as well as bubbles other defects, in the polymer coating. If the polymer coating at the stage of the process involving the application of pressure to the coated substrate, (e.g. by a calender roll) is still too "soft", the nip pressure can force air through the coating, which could result in pinholes produced by pockets of air or bubbles which may have become entrapped and pressurized during the coating process and which have subsequently burst in the coated substrate. The use of a peelable release layer may provide resistance to the entrapment of pockets of air in the coating, which may therefore enable the production of a more consistent laminate.

It is not, of course, intended that the invention be limited by the theories set out under (a) and (d) above.

The copolyetherester-containing layer preferably contains at least 50 weight percent, preferably at least 65 weight percent, preferably at least 80 weight percent, more preferably at least 90 weight percent, and particularly at least 99 weight percent of the copolyetherester(s) based on the weight of polymer in that layer. The copolyetherester(s) are generally hydrophilic, as described in more detail below.

The viscosity of the copolyetheresters is less than about 3000 Pa.s and preferably at least 20 Pa.s, measured according to the standard ISO11443. Preferably, the viscosity is in the range from about 20 to about 2000 Pa.s, more preferably from about 40 to about 1000 Pa.s, and more preferably from about 50 to about 700 Pa.s, measured according to the standard ISO11443. The viscosity in Pa.s is measured according to the standard ISO 11443 as a function of shear rate in $sec^{-1}$ and temperature. The temperatures used in the measurement of viscosity are from a minimum of just above the melting (or softening) point of the polymer (typically from about 200 to about 210° C.) up to a maximum of just above the temperatures (typically from about 230 to about 260° C., particularly from about 240 to about 250° C.) used in the processing methods (for example, coextrusion, injection molding and lamination) of thermoplastic materials. The temperatures used in the processing of thermoplastics are generally from about 20 to about 50° C., and particularly from about 40 to about 50° C., above the melting point of the thermoplastic. The shear rates used in the measurement of viscosity were from about 10 to about 10000 $sec^{-1}$, which encompass those typically encountered in the processing methods of thermoplastic materials.

In one embodiment of the invention, the viscosity of the copolyetheresters is less than about 3000 Pa.s, preferably at least 20 Pa.s, preferably from about 20 to about 2000 Pa.s, more preferably from about 40 to about 1000 Pa.s, and more preferably from about 50 to about 700 Pa.s, in the temperature range from about 200 to about 250° C., as measured according to the standard ISO11443. In an alternative embodiment, the viscosity of the copolyetheresters is less than about 3000 Pa.s, preferably at least 20 Pa.s, preferably from about 20 to about 2000 Pa.s, more preferably from about 40 to about 1000 Pa.s, and more preferably from about 50 to about 700 Pa.s, at a temperature 20 to 35° C. below the processing temperature used in the process of the invention, as measured according to the standard ISO11443. In this embodiment, reference to "the processing temperature used in the process of the invention" is preferably a reference to the extrusion temperature used in the preferred coextrusion coating process of the invention.

Preferably, the melting point of the copolyetheresters is greater than 120° C., usually from about 120° C. to above about 220° C. If the melting point of the copolyetherester is less than about 120° C., then the polymer is tacky and difficult to handle in film form; and if the melting point is more than about 220° C., then the films become excessively stiff. The melting points are determined by differential scanning calorimetry (DSC) in accordance with the standard ISO 3146.

In one embodiment of the invention, the copolyetherester elastomer(s) are selected from those described in U.S. Pat. No 4,725,481, the disclosure of which is incorporated herein by reference.

In a preferred embodiment, the copolyetherester elastomer(s) have a multiplicity of recurring long-chain ester units and short-chain ester units joined head-to-tail through ester linkages, said long-chain ester units being represented by the formula:

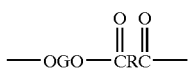 (I)

and said short-chain ester units being represented by the formula:

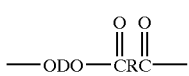 (II)

wherein

G is a divalent radical remaining after the removal of terminal hydroxyl groups from a poly(alkylene oxide) glycol having an average molecular weight of about 400–3500, wherein the amount of ethylene oxide groups incorporated in said one or more copolyetheresters by the poly(alkylene oxide)glycol is from about 20 to about 68 weight percent, preferably from about 25 to about 68 weight percent, based upon the total weight of the copolyetherester(s);

R is a divalent radical remaining after removal of carboxyl groups from a dicarboxylic acid having a molecular weight less than about 300;

D is a divalent radical remaining after removal of hydroxyl groups from a diol having a molecular weight less than about 250;

wherein said copolyetherester(s) contain from about 25 to about 80 weight percent short-chain ester units.

It is preferred that said copolyetheresters(s) have an MVTR of at least about 2500, preferably at least about 3500, and more preferably from about 3500 to about 20000, gm.mil/m²/24 hrs according to ASTM E96-66 (Procedure BW).

As used herein, the term "ethylene oxide groups incorporated in the copolyetherester(s)" means the weight percent in the total copolyetherester(s) of (CH₂—CH₂—O—) groups in the long-chain ester units. The ethylene oxide groups in the copolyetherester that are counted to determine the amount in the polymer are those derived from the poly(alkylene oxide)glycol and not ethylene oxide groups introduced into he copolyetherester by means of a low molecular weight diol.

As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxy groups and having a molecular weight of from about 400 to about 3500, particularly from about 600 to about 1500. The poly(alkylene oxide) glycols used to make the copolyetheresters should contain ethylene oxide groups in amounts that result in a copolyetherester having from about 20 to about 68, preferably from about 25 to about 68, more preferably from about 30 to about 55, weight percent ethylene oxide groups, based on the total weight of the copolyetherester. The ethylene oxide groups cause the polymer to have the characteristic of being readily permeable to moisture vapor and, generally, the higher the percentage of ethylene oxide in the copolyetherester, the higher degree of water permeability. Random or block copolymers of ethylene oxide containing minor portions of a second poly(alkylene oxide) glycol can be used. Generally, if a second monomer is present, the second monomer will constitute less than about 30 mol percent of the poly(alkylene oxide)glycols, and usually less than about 20 mol percent. Representative long-chain glycols include poly(ethylene oxide)glycol, ethylene-oxide capped polypropylene oxide glycol, mixtures of poly(ethylene oxide)glycol with other glycols such as ethylene oxide capped poly(propylene oxide)glycols and/or poly(tetramethylene oxide)glycol provided the resulting copolyetherester has an amount of ethylene oxide groups of at least about 25 weight percent. Copolyetheresters prepared from poly(ethylene oxide)glycols having a molecular weight of from about 600 to 1500 are preferred because they provide a combination of superior moisture vapor permeability and limited water swell and, when formed into a film, they exhibit useful properties over a wide temperature range.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Included among the low molecular weight diols which react to form short-chain ester units suitable for use for preparing copolyetheresters are acyclic, alicyclic and aromatic dihydroxy compounds. Preferred compounds are diols with 2–15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2–8 carbon atoms, most especially 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

The term "aliphatic dicarboxylic acids", as used herein, means carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid decahydro-1,5-naphthylene dicarboxylic acid, 4,4,'-bicyclohexyl dicarboxylic acid, decahydro-2,6-naphthylene dicarboxylic acid, 4,4,'-methylenebis(cyclohexyl) carboxylic acid, 3,4-furan dicarboxylic acid. Preferred acids are cyclohexane-dicarboxylic acids and adipic acid.

Representative aromatic dicarboxylic acids include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$–$C_{12}$ alkyl and ring substitution derivatives thereof, such as halo, alkoxy, and aryl derivatives. Hydroxyl acids such as p-(beta-hydroxyethoxy) benzoic acid can also be used providing an aromatic dicarboxylic acid is also present.

Aromatic dicarboxylic acids are a preferred class for preparing the copolyetherester polymers useful for this invention. Among the aromatic acids, those with 8–16 carbon atoms are preferred, particularly terephthalic acid alone or with a mixture of phthalic and/or isophthalic acids.

The copolyetheresters contain about 25–80 weight percent short-chain ester units corresponding to Formula (II) above, the remainder being long-chain ester units corresponding to Formula (I) above. When the copolyetheresters contain less than about 25 weight percent short-chain ester units, then the crystallization rate becomes very slow and the copolyetherester is tacky and difficult to handle. When more than about 80 weight percent short-chain ester units are present, then the copolyetheresters generally become two stiff. The copolyetheresters preferably contain about 30–60, preferably about 40–60, weight percent short-chain ester units the remainder being long-chain ester units. In general, as percent short-chain ester units in the copolyetherester are increased, the polymer has a higher tensile strength and modulus, and the moisture vapor transmission rate decreases. Most preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

The MVTR of the copolyetheresters can be regulated by various means. The thickness of a layer of copolyetherester has an effect on the MVTR in that the thinner the layer the higher the MVTR. An increase in the percent of short-chain ester units in the copolyetherester results in a decrease in the MVTR, but also results in an increase in the tensile strength of the layer due to the fact the polymer is more crystalline.

The Young's moduli of the copolyetherester elastomers preferably are from 1000 to 14,000 psi, usually 2000 to 10,000 psi, as determined by ASTM Method D-412. The modulus can be controlled by the ratio of short-chain segments to long-chain segments of the copolyetherester elastomer, and comonomer choice for preparation of the copolyetherester. Copolyetheresters having a relatively low modulus generally confer better stretch recovery and aesthetics to the laminate structure where the stiffness and drape of the structure are important.

Preferably, the copolyetherester elastomers are prepared from esters or mixtures of esters of terephthalic acid and isophthalic acid, 1,4-butanediol and poly(tetramethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(ethylene oxide)glycol.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol. The copolyetherester elastomers described herein can be made conveniently by a conventional ester interchange reaction. A preferred procedure involves heating the ester of an aromatic acid, e.g., dimethyl ester of terephthalic acid, with the poly(alkylene oxide) glycol and a molar excess of the low molecular weight diol, 1,4-butanediol, in the presence of a catalyst at 150°–160° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm pressure and 240°–260° C. for less than 2 hours in the presence of antioxidants such as 1,6-bis-(3,5-di-tert-butyl-4-hydroxyphenol)propionamido]-hexane or 1,3,5-trimethyl-2,4,6-tris[3,5-ditertiary-butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/ antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques for example, interfacial polymerization of bisphenol with bisacylhalides and bisacylhalide capped linear diols, may be useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetheresters possess many desirable properties, it is sometimes advisable to stabilize these compositions further against heat or light produced degradation. This is readily achieved by incorporating stabilizers in the copolyetherester compositions. Satisfactory stabilizers comprise phenols, especially hindered phenols and their derivatives, amines and their derivative, especially arylamines.

Representative phenol derivatives useful as stabilizers include 4,4,'-bis(2,6-di-tertiarybutylphenol); 1,3,5-trimethyl-2,4,6-tris[3,5-ditertiary-butyl-4-hydroxybenzyl] benzene and 1,6-bis[3,5-di-tert-butyl-4-hydroxyphenyl) propionamido]hexane. Mixtures of hindered phenols with co-stabilizers such as diaurylthiodipropionate or phosphites are particularly useful. Improvement in light stability occurs by the addition of small amounts of pigments or the incorporation of a light stabilizer, such as benzotriazole ultraviolet light absorbers. The addition of hindered amine photostabilizers, such as bis(1,2,2,6,6-pentamethyl-4-piperidinyl) n-butyl-(3,5-di-tert-butyl-4-hydroxybenzyl) malonate, usually in amounts of from 0.05–1.0% by weight of the copolyetherester, are particularly useful in preparing compositions having resistance to photodegradation.

Various conventional fillers can be added to the copolyetheresters usually in amounts of from about 1–10 percent by weight based on the total weight of the copolyetherester (s) and fillers only. Fillers such as clay, talc, alumina, carbon black and silica can be used, the latter being preferred, and white and light colored pigments can be added to the polymers. In general, these additives have the effect of increasing the modulus at various elongations.

The laminate structure obtainable by the process of the present invention is waterproof and moisture vapor permeable and has the advantage that the copolyetherester-containing layer is strongly adhered to the substrate.

Where the laminate obtainable by the process of the present invention comprises a copolyetherester-containing layer and a tie layer comprising poly(ethylene vinyl acetate) as hereinbefore described, the laminate structure has the further advantage that it is capable of exhibiting differential permeability, i.e. the MVTR in one direction through the layers of the laminate is greater than the MVTR in the opposite direction. Thus, the use of a tie layer not only improves adhesion but also, in combination with the copolyetherester-containing layer, enables the structure to exhibit differential permeability.

In such laminate structures exhibiting differential permeability, the MVTR in the direction away from the copolyetherester-containing layer and tie layer and towards the substrate (referred to in Formula (1) below as $MVTR_{CAS}$) is greater than the MVTR in the direction away from the substrate layer and towards the tie layer and copolyetherester-containing layer (referred to in Formula (1) below as $MVTR_{SAC}$). The MVTR ratio may be expressed as:

$$MVTR_{CAS}/MVTR_{SAC} \qquad \text{(Formula 1)}$$

In a preferred embodiment, the MVTR ratio is at least about 1.5 and is preferably from about 2 to about 10.

The MVTR of each layer is primarily dependent upon the chemical composition of the layer and the thickness of the layer, and these parameters can be adjusted to tailor a laminate so that it is suitable for a particular end-use, as required.

In a preferred embodiment of the invention, the MVTR of the tie layer is from about 100 to about 2000, preferably from about 150 to about 1500, gm.mil/m$^2$/24 hrs according to ASTM E96-66 (Procedure BW); and the MVTR of the copolyetherester-containing layer is at least about 2500, preferably at least about 3500, and more preferably from about 3500 to about 20000, gm.mil/m$^2$/24 hrs according to ASTM E96-66 (Procedure BW).

If it is desired to have the laminate function as a vapor control layer, a control layer as described above is added between the substrate and the tie layer. Typically, the control layer is such that the MVTR of the laminate structure containing the control layer is 5 to 10, and preferably 20, times less than the MVTR of the laminate structure without the control layer.

The permeability is not linear with vapor pressure (relative humidity). As the relative humidity is increased, the copolyetherester-containing layer absorbs water in an amount determined by its composition which causes it to swell and become more permeable. The water swell capability of the copolyetherester increases with an increase in the weight percent of the long-chain ester units in the polymer.

In the preferred embodiment of the invention, good bond strength is obtained between the film layer and the substrate, even when the film layer is very thin. In a preferred embodiment of the invention, where the film layer is comprised primarily of a copolyetherester and the substrate is a nonwoven comprised primarily of polyolefin fibers, it is preferred that the laminate material of the invention exhibit a bonding strength of at least 0.1 N/m. More preferably, the bonding strength of the laminate material is a least 1 N/m, and more preferably at least 2 N/m. According to an even more preferred embodiment of the invention, where the film layer is comprised primarily of a copolyetherester with a thickness of less than 50 μm and the substrate is a nonwoven comprised primarily of polyolefin fibers, the bonding strength between the film and the substrate is at least 3 N/m, and more preferably at least 5 N/m, and even more preferably at least 8 N/m, and most preferably at least 10 N/m.

The laminate structures obtainable by the process of the present invention have a number of uses. The laminates are of particular use as membranes which are waterproof moisture vapor permeable membranes, particularly membranes having differential permeability. Of particular importance is their use in the construction industry, for example as roof or wall liners. The laminates may also be used in the manufacture of waterproof and water vapor permeable fabric for use in, for example, agricultural mats, absorbent hygiene articles, garments and surgical drapes. Such waterproof and water vapor permeable garments may comprise a substrate such as nylon or polyester.

Turning now to the drawings, and referring to FIG. 1, a tie layer (2a), the thermoplastic polymer resin layer (2b) and the release layer (3) are coextruded from the extruder (10) onto the substrate (1). The coated substrate is pressed between nip roll (11) and chill roll (12). The release layer (3) is peeled off onto a separate roller (not shown) for recycling or disposal and the finished laminate (4) rolled onto a further roller (not shown).

Figure 2:
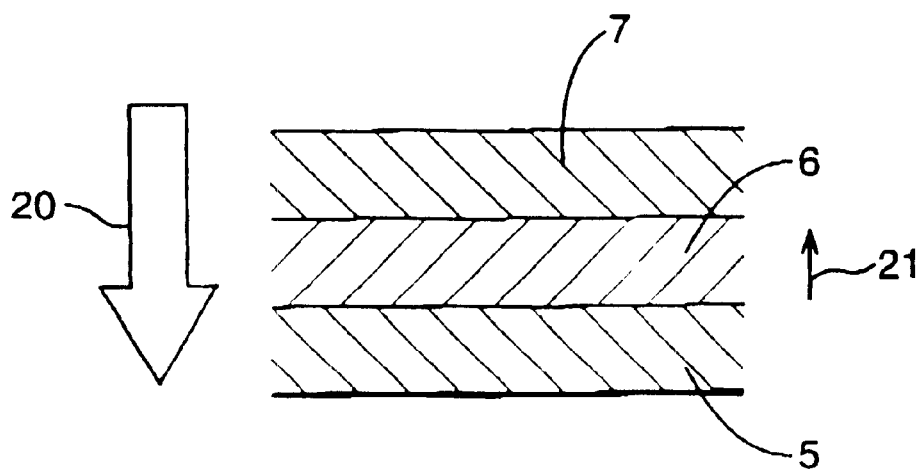
FIG. 2 is a sectional view of a three-layer laminate structure obtainable by the process of the present invention.

Referring to FIG. 2, the laminate structure consists of a substrate (5), a tie layer (6) and thermoplastic polymer resin coating (7). Arrow 20 in FIG. 2 refers to the principal direction of transmission of moisture vapor. There is little or no transmission of moisture vapor in the direction of arrow 21.

The invention is further illustrated by the following examples. It will be appreciated that the examples are for illustrative purposes only and are not intended to limit the invention as described above. Modification of detail may be made without departing from the scope of the invention.

EXAMPLES

The process of the invention is exemplified in the following examples. A series of laminates were prepared using a peelable release layer in an extrusion coating process according to the invention. A series of Comparative Examples was also prepared without the use of a peelable release layer.

In the examples, the substrate was either a polypropylene (PP) nonwoven or a polyethylene (PE) nonwoven. The substrates used in the examples were 55 cm wide. The PP nonwoven substrate was Xavan® 5217-B spunbonded polypropylene sheet with a basis weight of 85 g/m$^2$ (available from E.I. du Pont de Nemours and Company). The PE nonwoven was Tyvek® 1460B with a basis weight of 60 g/m (available from E.I. du Pont de Nemours and Company). A tie layer comprising ELVAX® 3175 (a copolymer comprising about 72% ethylene and about 28% vinyl acetate; available from E.I. du Pont de Nemours and Company) was utilized in some of the examples. The peelable release layer was LDPE (STAMYLAN® 8108; available from DSM).

The copolyetherester-containing layer used in each of the examples was ACTIVE MEMBRANE AM6000® (E.I. du Pont de Nemours and Company). AM 6000® is a hydrophilic copolyetherester containing 45 weight percent 1,4-butylene terephthalate, and 55 weight percent ethylene oxide/propylene oxide copolyether terephthalate. The copoly(alkylene oxide) glycol used to make the copolyetherester was obtained by end-capping poly(propylene ether) glycol with 64 weight percent ethylene oxide, and had a molecular weight of about 2100. The copolyetherester had a calculated ethylene oxide content of 33 weight percent, and contained 45 weight percent short-chain ester units. The polymer had a melting point of 200° C. The resin was dried in a dehumidifying dryer (either 8 hours at 80° C. or 2 hours at 210° C.) prior to use.

Comparative Example 1

A copolyetherester film of the AM 6000® polymer was extrusion coated onto the PP nonwoven substrate described above using an extrusion lamination apparatus like that described above with regard to FIG. 1. The substrate was corona treated at 2 kW prior to the extrusion coating. The copolyetherester resin was fed in pellet form into a 2.5 inch (64 mm) diameter, 40 HP screw extruder that was connected to a BAC three layer melt combining block. In this comparative example, the only polymer melt fed to the melt bloc was the copolyetherester. The copolyetherester polymer was fed to the melt bloc at a melt temperature of 250° C. The melt was extruded as a molten film through a 705 mm long die having a die gap of 0.7 mm. The molten film was coated on the PP nonwoven substrate without the application of an adhesive. The PP nonwoven substrate was spaced 150 mm below the opening of the die. The PP substrate and molten film layer were immediately pressed between a chill roll and a nip roll. The chill roll was a 750 mm diameter, chrome plated, water cooled ($T_{min}$=8° C.) roll and the nip roll was a roll with a silicone rubber surface having an 80 Shore A hardness. The nip pressure was maintained at 27 kg/linear cm. The nonwoven was fed into the nip at a line speed of 100 m/min. After the film was cooled on the rotating chill roll, the laminate was removed from the chill roll by a transfer roll from which the laminate was fed to a take-up roll. A substrate with a 25 µm thick film layer was obtained. As summarized in Table 1, the bond strength between the substrate and the film layer was negligible.

Comparative Example 2

A copolyetherester film of the AM 6000® polymer was extrusion coated onto the PP nonwoven substrate described above according to the process of Comparative Example 1 except that the polymer melt feed rate was increased so as to obtain a 40 µm thick copolyetherester film layer. As summarized in Table 1, below, the bond strength between the substrate and the film layer was negligible.

Example 1

A copolyetherester film of the AM 6000® polymer was extrusion coated onto the PP nonwoven substrate described above according to the process of Comparative Example 1, with the following additional steps. A low density polyethylene was (STAMYLAN® 8108 LDPE from DSM) was extruded from a 3.5 inch (90 mm) diameter, 150 HP screw extruder that was also connected to the BAC three layer melt combining block. The LDPE polymer was fed to the melt bloc at a melt temperature of 250° C. A bi-component molten film with the copolyetherester as the A layer and the LDPE as the B layer was extruded through the die. The molten film was brought into contact with the corona treated PP substrate as described in Comparative Example 1, with the copolyetherester side of the film facing the PP substrate. The laminate removed from the chill roll had a 25 µm thick copolyetherester film layer and a 2 µm thick LDPE film layer. The LDPE film layer was peeled off of the copolyetherester layer leaving a PP substrate/copolyetherester film laminate. As summarized in Table 1, the bond strength between the substrate and the film layer was 0.19 N/m.

Example 2

A copolyetherester film of the AM 6000® polymer was extrusion coated onto the PP nonwoven substrate described above according to the process of Example 1, except that the melt feed rate for the LDPE polymer was increased so as to obtain a 20 µm thick LDPE film layer. As summarized in Table 1, with this change, the bond strength between the substrate and the film layer was increased to 10.4 N/m.

Comparative Example 3

A copolyetherester film of the AM 6000® polymer was extrusion coated onto the PP nonwoven substrate described above according to the process of Comparative Example 1, with the following additional steps. An EVA tie layer (ELVAX® 3175; E.I. du Pont de Nemours and Company) was extruded from a 2.5 inch (64 mm) diameter, 40 HP screw extruder that was also connected to the BAC three layer melt combining block. The EVA polymer was fed to the melt bloc at a melt temperature of 240° C. A bi-component molten film with the copolyetherester as the A layer and the LDPE as the C layer was extruded through the die. The molten film was brought into contact with the corona treated PP substrate as described in Comparative Example 1, with the EVA side of the film facing the PP substrate. The laminate removed from the chill roll had a 25 µm thick copolyetherester film layer and a 3 µm thick EVA film tie layer between the copolyetherester layer and the PP substrate. As summarized in Table 1, the bond strength between the substrate and the film layer was 2.3 N/m.

Example 3

A copolyetherester film of the AM 6000® polymer was extrusion coated onto the PP nonwoven substrate described above according to the process of Comparative Example 3, with the following additional steps. A low density polyethylene was (STAMYLAN® 8108 LDPE from DSM) was extruded from a 3.5 inch (8.9 cm) diameter, 150 HP screw extruder that was also connected to the BAC three layer melt combining block. The LDPE polymer was fed to the melt bloc at a melt temperature of 250° C. A three-component molten film, with the copolyetherester layer A sandwiched between the LDPE layer B on one side and the EVA layer C on the opposite side, was extruded through the die. The molten film was brought into contact with the corona treated PP substrate as described in Comparative Example 1, with the EVA side of the film facing the PP substrate. The laminate removed from the chill roll had a 3 µm thick film EVA layer adhered between the PP substrate and a 25 µm thick copolyetherester film layer. A 2 µm thick LDPE film layer was adhered to the opposite side of the copolyetherester layer. The LDPE film layer was peeled off of the copolyetherester layer leaving a PP substrate/EVA film/copolyetherester film laminate. As summarized in Table 1, the bond strength between the substrate and the film layer was 3.6 N/m.

Example 4

A copolyetherester film of the AM 6000® polymer was extrusion coated onto the corona treated PP nonwoven substrate described above according to the process of Example 3, except that the melt feed rate for the LDPE polymer was increased so as to obtain a 20 µm thick LDPE film layer. As summarized in Table 1, with this change, the bond strength between the substrate and the film layer was such that the polymer film failed before the film delaminated from the substrate. The tear strength of the polymer film, measured according to ASTM D1004, exceeds 100 N/m.

The MVTR ratio of the laminate of Example 4, with the peelable release layer removed, was measured as follows. Using the standard test NF G52 ("up cup" method at a temperature of 32° C.), the MVTR wherein the substrate was facing humidity was measured at 1076 gm/m$^2$/24 hrs, and the MVTR wherein the copolyetherester-containing layer was facing humidity was measured at 2328 gm/m$^2$/24 hrs. The MVTR ratio is therefore 2.16.

Comparative Example 4

A copolyetherester film of the AM 6000® polymer was extrusion coated onto the nonwoven substrate according to the process of Comparative Example 1, except that a corona treated polyethylene nonwoven substrate (Tyvek® 1460B; from E.I. du Pont de Nemours and Company) was used in place of the PP nonwoven substrate. As summarized in Table 1, the bond strength between the substrate and the film layer was negligable.

Example 5

A copolyetherester film of the AM 6000® polymer was extrusion coated onto the nonwoven substrate according to the process of Example 1, except that a corona treated polyethylene nonwoven substrate (Tyvek® 1460B; from E.I. du Pont de Nemours and Company) was used in place of the PP nonwoven substrate. As summarized in Table 1, the bond strength between the substrate and the film layer was 2.2 N/m.

Example 6

A copolyetherester film of the AM 6000® polymer was extrusion coated onto the nonwoven substrate according to the process of Comparative Example 4, except for the following changes. A corona treated polyethylene nonwoven substrate (Tyvek® 1460B; from E.I. du Pont de Nemours and Company) was used in place of the PP nonwoven substrate. In addition, the thickness of the ELVAX® tie layer was extruded as a 4 μm thick film layer instead of the 3 μm thick film layer of Example 4. As summarized in Table 1, with this change, the bond strength between the substrate and the film layer was such that the TYVEK® substrate delaminated before the film delaminated from the substrate.

The bonding strength was measured for each of the laminates described in the examples above according to standard test ISO 2411. The results are shown in Table 1.

TABLE 1

| | Substrate | Tie Layer (thickness) | Polymer Resin (thickness) | Release Layer (thickness) | Bonding Strength (N/m) |
|---|---|---|---|---|---|
| Comparative Example 1 | PP | — | AM6000 (25 μm) | — | <0.02 |
| Comparative Example 2 | PP | — | AM6000 (40 μm) | — | <0.02 |
| Example 1 | PP | — | AM6000 (25 μm) | LDPE (2 μm) | 0.19 |
| Example 2 | PP | — | AM6000 (25 μm) | LDPE (20 μm) | 10.4 |
| Comparative Example 3 | PP | ELVAX (3 μm) | AM6000 (25 μm) | — | 2.3 |
| Example 3 | PP | ELVAX (3 μm) | AM6000 (25 μm) | LDPE (2 μm) | 3.6 |
| Example 4 | PP | ELVAX (3 μm) | AM6000 (25 μm) | LDPE (20 μm) | a |
| Comparative Example 4 | PE | — | AM6000 (25 μm) | — | <0.02 |
| Example 5 | PE | — | AM6000 (25 μm) | LDPE (20 μm) | 2.2 |
| Example 6 | PE | ELVAX (4 μm) | AM6000 (25 μm) | LDPE (20 μm) | b | a: polymer coating destroyed (bonding strength > polymer coating strength)
b: substrate destroyed (bonding strength > substrate strength)

The test data presented in Table 1 show that the process of the invention is capable of providing a laminate having good adhesion between the polymer coating and the substrate even when the polymer coating has very low thickness.

What is claimed is:

1. A process for the preparation of a laminate comprising a substrate having on a surface thereof a thermoplastic polymer resin coating and further comprising a release layer in contact with the surface of said thermoplastic polymer resin remote from the substrate, the release layer being peelable from the thermoplastic polymer resin, said process comprising the steps of forming or providing a substrate layer and coextruding the thermoplastic polymer resin coating and release layer onto the substrate, said release layer having a thickness less than the thickness of said thermoplastic polymer resin coating, wherein the thermoplastic polymer resin has a viscosity less than about 3000 Pa.s measured according to the standard ISO11443 at a temperature 20 to 35° C. below the extrusion temperature.

2. A process according to claim 1 wherein said thermoplastic polymer resin has a viscosity of from about 40 to about 1000 Pa.s measured according to the standard ISO11443 at a temperature 20 to 35° C. below the extrusion temperature.

3. A process according to claim 1 wherein the process comprises the further step of removing said release layer and optionally recycling said release layer.

4. A process according to claim 1 wherein said thermoplastic polymer resin coating has a thickness less than about 50 μm.

5. The process of claim 4 wherein the bonding strength between the substrate layer and the thermoplastic polymer resin, measured according to ISO 2411, is at least 1 N/m.

6. A process according to claim 1 wherein $T_{RL}/T_{CL}$ is from about 0.05 to about 0.8 where $T_{RL}$ is the thickness of the release layer and $T_{CL}$ is the thickness of the thermoplastic polymer resin coating.

7. A process according to claim 1 wherein said release layer comprises polyethylene or polypropylene.

8. A process according to claim 1 wherein a tie layer is coextruded with said thermoplastic polymer resin.

9. A process according to claim 8 wherein the thickness of said tie layer is less than the thickness of the thermoplastic polymer resin layer.

10. A process according to claim 8 wherein the substrate comprises a polyolefin, the tie layer comprises a copolymer of ethylene and vinyl acetate, and the thermoplastic polymer resin comprises one or more copolyetheresters(s).

11. A process according to claim 10 wherein $MVTR_{CAS} > MVTR_{SAC}$ wherein $MVTR_{CAS}$ is the moisture vapor transmission rate (MVTR) in the direction away from the copolyetherester-containing layer and tie layer and towards the substrate and $MVTR_{SAC}$ is the MVTR in the direction away from the substrate layer and towards the tie layer and copolyetherester-containing layer.

12. A process according to claim 1 wherein said substrate comprises a polyolefin.

13. A process according to claim 1 wherein said thermoplastic layer comprises one or more copolyetherester elastomers.

14. A process according to claim 13 wherein said copolyetherester elastomers have a multiplicity of recurring long-chain ester units and short-chain ester units joined head-to-tail through ester linkages, said long-chain ester units being represented by the formula:

(I)

and said short-chain ester units being represented by the formula:

(II)

wherein
G is a divalent radical remaining after the removal of terminal hydroxyl groups from a poly(alkylene oxide) glycol having an average molecular weight of about 400–3500, wherein the amount of ethylene oxide groups incorporated in said one or more copolyetheresters by the poly(alkylene oxide)glycol is from about 25 to about 68 weight percent based upon the total weight of the copolyetherester(s);
R is a divalent radical remaining after removal of carboxyl groups from a dicarboxylic acid having a molecular weight less than about 300;

D is a divalent radical remaining after removal of hydroxyl groups from a diol having a molecular weight less than about 250;

wherein said copolyetherester(s) contain from about 25 to about 80 weight percent short-chain ester units.

15. A process according to claim 14 wherein the moisture vapor transmission rate (MVTR) of the copolyetherester-containing layer is at least about 2500 gm.mil/m$^2$/24 hrs according to ASTM E96-66 (Procedure BW).

16. A process according to claim 1 wherein said thermoplastic polymer resin coating has a thickness less than about 30 μm.

17. The process of claim 16 wherein the bonding strength between the substrate layer and the thermoplastic polymer resin, measured according to ISO 2411, is at least 3 N/m.

18. A process for the preparation of a laminate comprising a polyolefin substrate having on a surface thereof a tie layer, said tie layer having a thermoplastic polymer resin coating on a surface thereof remote from said substrate, and further comprising a release layer in contact with a surface of said thermoplastic polymer resin remote from the substrate, the release layer being peelable from the thermoplastic polymer resin, said process comprising the steps of forming or providing a substrate layer and coextruding the tie layer, the thermoplastic polymer resin coating and the release layer onto the substrate, said release layer having a thickness less than the thickness of said thermoplastic polymer resin coating, wherein the tie layer comprises a copolymer of ethylene and vinyl acetate, and the thermoplastic polymer resin comprises one or more copolyetheresters(s), the thermoplastic polymer resin having a viscosity less than about 3000 Pa.s measured according to the standard ISO11443 at a temperature 20 to 35° C. below the extrusion temperature, and wherein $MVTR_{CAS} > MVTR_{SAC}$, where $MVTR_{CAS}$ is the moisture vapor transmission rate (MVTR) in the direction away from the copolyetherester-containing layer and tie layer and towards the substrate and $MVTR_{SAC}$ is the MVTR in the direction away from the substrate layer and towards the tie layer and copolyetherester-containing layer, and the MVTR ratio defined as $MVTR_{CAS}/MVTR_{SAC}$ is at least about 1.5.

19. A process for the preparation of a laminate comprising a substrate having on a surface thereof a thermoplastic polymer resin coating and further comprising a release layer in contact with the surface of said thermoplastic polymer resin remote from the substrate, the release layer being peelable from the thermoplastic polymer resin, said process comprising the steps of forming or providing a substrate layer and coextruding the thermoplastic polymer resin coating and release layer onto the substrate, wherein the thermoplastic polymer resin has a viscosity less than about 3000 Pa.s measured according to the standard ISO11443 at a temperature 20 to 35° C. below the extrusion temperature, and wherein $T_{RL}/T_{CL}$ is from about 0.05 to about 0.8 where $T_{RL}$ is the thickness of the release layer and $T_{CL}$ is the thickness of the thermoplastic polymer resin coating.

* * * * *